(12) United States Patent  
Roberts, Jr.

(10) Patent No.: US 6,671,357 B1  
(45) Date of Patent: Dec. 30, 2003

(54) APPARATUS AND METHOD FOR INTERRUPTING DATA TRANSMISSIONS

(75) Inventor: Evans V. Roberts, Jr., Canton, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/452,635

(22) Filed: Dec. 1, 1999

(51) Int. Cl.[7] .............................................. H04M 11/00
(52) U.S. Cl. ................... 379/93.02; 379/93.05; 713/200
(58) Field of Search ..................... 379/93.01–93.02, 379/93.05, 93.09, 93.34, 100.15–100.16, 88.21, 114.01, 189, 184, 168, 441–445, 188, 199–200; 713/200–202; 361/1–2, 91.1–91.2; 368/4; 375/222

(56) References Cited

U.S. PATENT DOCUMENTS

| | | | |
|---|---|---|---|
| 4,137,556 A | * 1/1979 | Sessa | 361/91.2 |
| 4,782,498 A | 11/1988 | Copeland, III | 375/222 |
| 5,267,301 A | * 11/1993 | Nishii | 379/93.09 |
| 5,530,703 A | 6/1996 | Liu et al. | 370/252 |
| 5,608,662 A | 3/1997 | Large et al. | 370/394 |
| 5,663,819 A | * 9/1997 | Lewis | 359/118 |
| 5,699,414 A | 12/1997 | Telibasa | 379/88.13 |
| 5,706,507 A | 1/1998 | Schloss | 707/104.1 |
| 5,822,404 A | 10/1998 | Cave | 379/88.13 |
| 5,832,212 A | 11/1998 | Cragun et al. | 713/202 |
| 5,852,653 A | * 12/1998 | Reel et al. | 379/88.21 |
| 5,884,025 A | 3/1999 | Baehr et al. | 713/202 |
| 5,889,958 A | 3/1999 | Willens | 713/201 |
| 5,938,767 A | * 8/1999 | Horn | 713/200 |
| 5,960,416 A | * 9/1999 | Block | 705/34 |
| 6,320,948 B1 | * 11/2001 | Heilmann et al. | 379/189 |
| 6,442,106 B1 | * 8/2002 | Newby et al. | 368/4 |

* cited by examiner

Primary Examiner—George Eng  
(74) Attorney, Agent, or Firm—Kirkpatrick & Lockhart LLP

(57) ABSTRACT

An apparatus for interrupting data transmissions along a communications link between an input terminal and an output terminal of the apparatus. According to one embodiment, the apparatus includes a switch connected in series along the communications link, a bandpass filter and a processor. The bandpass filter includes an input terminal connected to the communications link and an output terminal connected to an input terminal of the processor. The processor includes an output terminal connected to a control terminal of the switch. The processor is programmed to detect participation in a handshake operation by a modem connected to the communications link and open the switch when participation in a handshake operation is detected.

15 Claims, 4 Drawing Sheets

APPARATUS AND METHOD FOR INTERRUPTING DATA TRANSMISSIONS

CROSS-REFERENCE TO RELATED APPLICATIONS

Not Applicable.

STATEMENT REGARDING FEDERALLY-SPONSORED RESEARCH AND DEVELOPMENT

Not Applicable.

BACKGROUND OF INVENTION

1. Field of Invention

The field of the present invention relates generally to communications and, more particularly, to apparatuses and methods for interrupting certain data transmissions along a communications link while permitting certain other data transmissions along the communications link.

2. Description of the Background

Due to the proliferation of the Internet, the World Wide Web, and web browsers, millions of personal computer users have easy access to a great quantity of information and documents from around the world. Some of the easily available information, however, is not appropriate for certain users. Accordingly, there has been great effort in recent years to restrict the exposure of certain materials to certain users. To address this issue, for example, some governments have legislated censorship of the Internet in order to minimize children's exposure to pornographic, violent, racist, and other indecent material.

In addition, several non-legislative mechanisms have been proposed and/or implemented to filter the information available to certain Internet users. One such solution includes periodically providing a supervisor (e.g., a parent) with a disk, such as a CD-ROM, on a subscription basis, which contains an updated database of blocked web sites. A utility program cross-references the database of blocked web sites when a user is accessing the World Wide Web, and selectively blocks the loading of the information from the blocked sites identified in the database. A known variation on this solution is to allow the supervisor to create and update the blocked sites, rather than providing them periodically to the supervisor on a subscription basis. These solutions, however, suffer from, among other things, the time delay between the creation of a new, objectionable sites and the inclusion of the sites in the database. They also suffer from the expense associated with monitoring all available sites for content. Furthermore, at least with the periodically provided database of blocked sites, a user is compelled to rely on the judgment of other individuals as to what is inappropriate.

Other mechanisms include generating a user profile including user selected censorship parameters. Data packets routed from a particular site are compared with the profile and, responsive to the comparison, either selectively displayed, modified, or filtered. These solutions, however, suffer from the inflexibility of the profile, as it may cause the filtering of innocuous sites, while permitting the display of sites which, although not within the censorship parameters, are nevertheless potentially objectionable.

A more recent proposal is to provide a coding system, in which organizations or interest groups supply ratings for labeling sites. According to such a solution, browsing software is employed which includes the ability to filter out or block selected sites based on the rating system and/or other criteria, such as viewer age and site content. The drawbacks of the prior mentioned solutions, however, apply equally to such a rating system.

Another solution is to simply prevent all communications between the personal computer and the Internet during certain times, such as time periods of potentially unsupervised usage by children. This approach not only blocks potentially objectionable sites, but all connections to remote data networks are disabled. However, because most personal computer owners/users access remote data networks, such as the Internet, with their personal computer through the same telephone line that connects to their telephone, disabling remote network access may additionally disable their telephone.

Accordingly, there exists a need for a method and apparatus to interrupt data transmissions between a personal computer and remote data networks which is not content-based, yet which does not disable other communications devices connected to the personal computer.

BRIEF SUMMARY OF INVENTION

The apparatuses and methods of the present invention provide a practical implementation to interrupt data transmissions along a communications link by monitoring the transmissions for particular frequency patterns, such as those indicative of a modem attempting to establish a connection with a remote data network, such as the Internet. Accordingly, the present invention may be used to selectively restrict access to remote data networks, such as the Internet. The present invention represents an advancement over prior mechanisms because it is not dependent on subjective opinions of the content of the information.

Furthermore, the present invention solves the problem of interrupting data transmissions along a communications link between a personal computer and the remote data network without interrupting the data transmissions of certain other devices using the same communications link, such as a telephone. More specifically, the present invention may interrupt data transmissions only when the modem attempts to establish a connection to a remote data network, leaving other transmissions, such as telephone transmissions, uninterrupted. In addition, the present invention may monitor a voltage level along the communications link and provide a signal indicative of whether the apparatus has been disconnected from the communications link. Thus, the present invention provides the further advantage of deterring tampering, sabotage, or other attempts to bypass or disable the apparatus because such attempts are identified and reported.

The present invention may be programmed such that it prevents remote data network access during certain times of the day, such as when parents are not at home, or it may be activated and deactivated as needed. The apparatus, of course, may be protected by security measures, such as a key or an access code so that only a select group of people can activate or deactivate the apparatus.

An apparatus for interrupting data transmissions along a communications link according to the present invention includes a switch connected in series along a communications link, a filter, and a processor. The filter includes an input terminal connected to the communications link and an output terminal connected to the processor. The processor includes an output terminal connected to a control terminal of the switch. The processor is programmed to detect participation in a handshake operation by a modem connected to the communications link and open the switch when participation in a handshake operation is detected. The processor may detect the modem participating in a handshake operation by the unique frequency patterns employed by modems to establish a connection between a personal computer and a remote data network. Upon detecting participation in the handshake operation, the processor may output a signal to open the switch, thereby interrupting data transmissions along the communications link and preventing a connection with the remote data network. The switch may be closed after a period of time, such as 5–20 seconds, such that other communication devices, such as a telephone, can access the communications link. Because telephone communications do not generate the same frequency patterns as the modem handshake, the operation of a telephone does not cause the apparatus to interrupt the data transmissions along the communications link, thereby allowing telephone use and still preventing modem use.

The switch may be, for example, a mechanical device, such as a relay, or solid state device, such as a transistor. The apparatus may also include a number of output devices, such as light emitting diodes, cathode ray tubes, liquid crystal displays, and audio speakers, to indicate that data transmissions along the communications link have been interrupted and to provide other relevant information. The apparatus may also include an input device, such as a keypad.

In addition to interrupting data transmission between a personal computer and a remote data network such as the Internet, the present invention may be utilized to interrupt data transmissions along a cable TV network to a television.

These and other benefits of the present invention will be apparent from the detailed description of the invention hereinbelow.

DESCRIPTION OF THE FIGURES

For the present invention to be clearly understood and readily practiced, the present invention will be described in conjunction with the following figures, wherein like reference numerals are used to designate like elements and wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements. For example, specific operating system details and modules contained in the processor are not shown. However, because such elements are well known in the art, and because they do not facilitate a better understanding of the present invention, a discussion of such elements is not provided herein.

Figure 1:
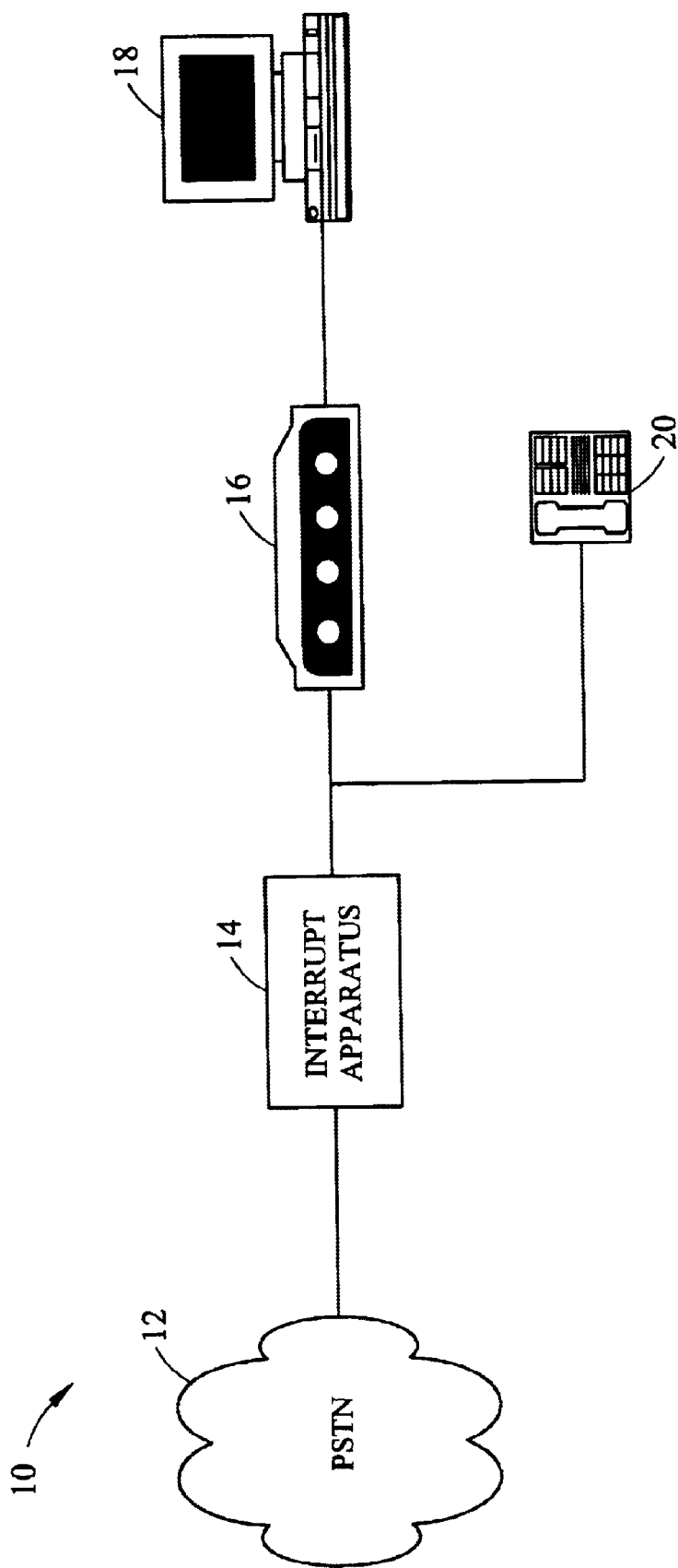
FIG. 1 is a block diagram of a communications network according to one embodiment of the present invention.

The present invention is directed to an apparatus and method for interrupting data transmissions. According to one embodiment, the present invention may be used to interrupt data transmissions between a personal computer and a remote data network such as, for example, the Internet. FIG. 1 is a block diagram of a network 10 in which the present invention may be incorporated. The network 10 includes a public switched telephone network (PSTN) 12, an interrupt apparatus 14 according to the present invention, a modem 16, a personal computer 18, and a telephone 20. Data may be transmitted to and from the PSTN 12 as modulated analog telecommunications signals to either the personal computer 18 or the telephone 20 over conventional telephone lines. A user of the telephone 20 may access the PSTN 12 to conduct a telephone conversation and a user of the personal computer 18 may access the PSTN 12 to connect to a remote data network, such as the Internet. Because, however, personal computers typically receive and transmit data in digital form, the modem 16 is required to demodulate the analog telecommunications signals into digital information when receiving data from the PSTN 12 and modulate digital information into analog telecommunications signals when transmitting data to the PSTN 12.

Before a connection is established between the personal computer 18 and the PSTN 12, the modem 16 may coordinate the appropriate data transmission rate according to a handshake operation. The handshake operation establishes the data transmission parameters between the user's modem 16 and another modem (not shown) connected to the PSTN 12 at the remote data network. The data transmission parameters may include the data transmission rate, and information concerning whether error correction and/or data compression techniques are to be employed. A typical handshake operation includes sending and receiving of coded signals between the user's modem 16 and the other modem (not shown), via the PSTN 12. The frequency patterns of the coded signals of the handshake operation are typically in the 300–3000 Hz range. According to one embodiment, the apparatus 14 interrupts data transmissions between the personal computer 18 and the PSTN 12 under certain circumstances, thus preventing the personal computer 18 from connecting to the PSTN 12 via the modem 16. However, use of the telephone 20 does not cause the apparatus 14 to interrupt data transmissions, thereby permitting communications between the telephone 20 and PSTN 12. When the apparatus 14 is not programmed to interrupt data transmissions to and from the modem 16, the personal computer 18 and the telephone 20 may communicate with the PSTN 12 via the apparatus 14.

Figure 2:
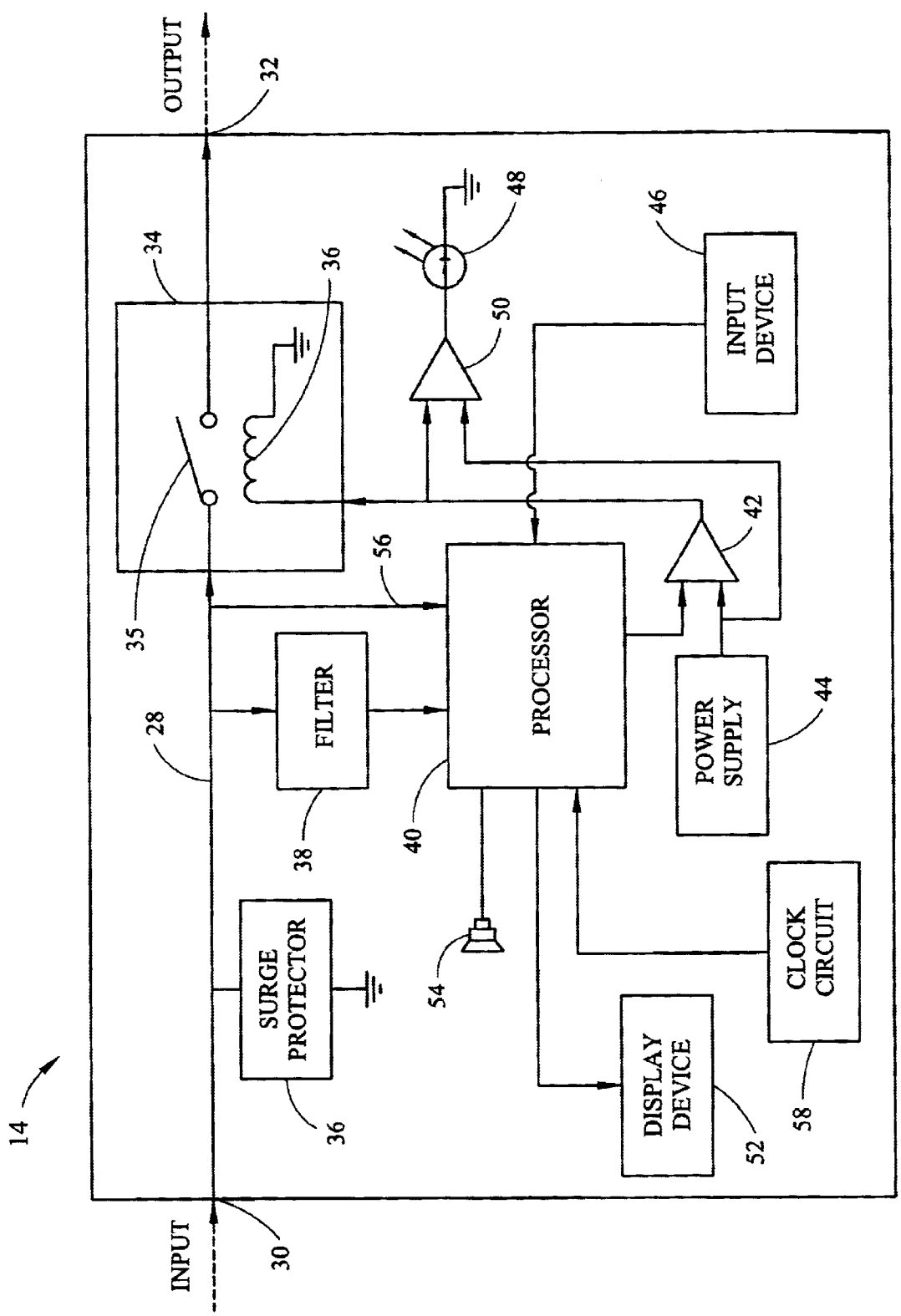
FIG. 2 is a combination block diagram and circuit schematic for an apparatus according to one embodiment of the present invention.

FIG. 2 is a combination schematic and block diagram of the apparatus 14 according to one such embodiment. The apparatus 14 is connected in series with a communications link 28 at an input terminal 30 and an output terminal 32 of the apparatus 14. According to one embodiment of the present invention, the input terminal 30 is in communication with the PSTN 12 and the output terminal 32 is in communication with the modem 16. The apparatus 14 may be positioned in a location on the premises such that a person is discouraged from bypassing the apparatus 14, such as near the telephone drop for the premises.

The apparatus 14 includes a switch 34 connected along the communications link 28 between the input and output terminals 30, 32 of the apparatus 14. The switch 34 may be, for example, a mechanical device, such as a single pole/single throw Form-C relay, or a solid state switching device, such as a transistor. In the illustrated embodiment, the switch 34 is a relay including a pole 35 and an energizing coil 36. The pole 35 is connected in series with the communications link 28 and may be normally closed to complete the communications link 28 between the input and output terminals 30, 32 of the apparatus 14. The coil 36 is in magnetic communication with the pole 35, such that when the coil 36 is energized, the magnetic force generated by the coil 36 opens the pole 35, thereby interrupting data transmissions between the input and output terminals 30, 32 of the apparatus 14 along the communications link 28.

The apparatus 14 may also include a surge protector 36 such as, for example, a metal oxide varistor (MOV) or a silicon avalanche diode (SAD), connected between the communications link 28 and ground. The surge protector 36 routes voltage surges on the communications link 28 to ground, thereby protecting the more sensitive components of the apparatus 14.

The apparatus 14 also includes a filter 38 and a processor 40. The filter 38 may be, for example, a bandpass filter, connected to the communications link 28 such that telecommunications signals within the band range of the filter 38 propagating along the communications link 28 are passed through the filter 38 to the processor 40. The processor 40 monitors the telecommunications signals within the band range and, under certain circumstances, opens the switch 34. For example, the processor 40 may output a signal to a control terminal of the switch 34, such as to energize the coil 36, causing the pole 35 to open, thereby interrupting the transmission of the data signals along the communications link 28.

For an embodiment of the present invention in which the apparatus 14 is employed to interrupt data transmissions between the personal computer 18 and PSTN 12, the filter 38 may, for example, pass signals to the processor 40 within the frequency range at the modem 16 receives and transmits the encoded signals of the handshake operation. The filter 38 may be a discrete element, such as illustrated in FIG. 2, or the processor 40 may programmed to filter or selectively monitor the signals on the communications link 28. For such an embodiment, the filter 38 may be an electronic filter within the processor 40. The filter 38 may also be of a design that allows for selective retuning as necessary due to technological changes in modems such as changes in modem frequencies.

The processor 40 may be a programmable digital signal processor such as, for example, one of the DSP56000 Digital Signal Processor IC family of processors, available from Motorola, of Schaumburg, Ill. The processor 40 may be programmed, for example, to interrupt the communications link 28 during the handshake process between the modem 16 and another device connected to the PSTN 12. For example, the processor 40 may be programmed to detect participation in a handshake operation by detecting frequency patterns in the signals passed by the bandpass filter 38 to the processor 40 indicative of a handshake operation. Upon detecting participation in a handshake operation by the modem 16, the processor 40 may output a signal to energize the coil 36 of the switch 34 to open the pole 35, such that the signals are unable to propagate along the communications link 28 of the apparatus 14. Accordingly, signals that are not indicative of modem handshake patterns, such as the voice modulated signals sent and received by the telephone 20, are uninterrupted as they propagate through the apparatus 14 via the communications link 28.

The output signals from the processor 40 may be buffered to better drive high current components of the apparatus 14. For example, the output terminal of the processor 40 may be connected to the switch 34 through a first buffer 42, such as, for example, an operational amplifier (op-amp), to buffer the output signal from the processor 40 to the switch 34. In addition to having an input terminal connected to the output terminal of the processor 40, the first buffer 42 may have an input terminal connected to a power supply 44. The power supply 44 may be, for example, a battery contained within the apparatus 14. According to an another embodiment, the power supply 44 may be an external power source such as, for example, the power source of a conventional telephone line.

The processor 40 may be programmed to only interrupt data transmissions along the communications link 28 upon detecting participation in a handshake operation by the modem 16 under certain circumstances. For example, the processor 40 may be programmed to only open the switch 34 upon detecting a handshake operation during specific time periods. Accordingly, the apparatus 14 of the present invention may be employed by a parent to prevent a child from accessing the Internet with a personal home computer while the parent is away from the home. The processor 40 may be programmed by an input device 46 in communication with the processor 40. The input device 46 may be, for example, a keyboard, a remote control device, or a mouse. The processor 40 may be activated by, for example, an on-off toggle on the input device 46, a key, or by entering a code on a keypad.

The processor 40 may open the switch 34 for a predetermined period of time and then close the switch 34 to allow the telephone 20 to use the communications link 28. Alternatively, the processor 40 may open the switch 34 until it is manually reset. For example, the processor 40 may be programmed to open the switch 34 for a specified period of time necessary to prohibit the modem 16 from completing the handshake operation and establishing a connection between the personal computer 18 and the PSTN 12 along the communications link 28. For example, the processor 40 may open the switch 34 for 5–20 seconds. Accordingly, the apparatus 14 may effectively interrupt data transmissions between the personal computer 18 and the PSTN 12 for as long as the apparatus 14 is activated, and yet permit a user of the telephone 20 to connect to the PSTN 12.

The apparatus 14 may also include one or more output devices 48, 52, 54. The output devices may be used to indicate that the apparatus 14 has interrupted data transmissions along the communications link 28. For example, the apparatus 14 may include a light emitting diode (LED) 48 to indicate that the apparatus 14 interrupted data transmissions between the personal computer 18 and the PSTN 12. Upon the interruption of data transmissions, the LED 48 may remain lit until reset by use of the input device 46. The LED 48 may be connected to the output terminal of the processor 40 via the first buffer 42 and a second buffer 50. The second buffer 50 may be, for example, an op-amp.

The apparatus 14 may also include a display device 52 such as, for example, an LCD display or a CRT display, in communication with the processor 40. The display device 52 may, for example, display the operating mode of apparatus 14, such as "activated" or "non-activated." Additionally, the display device 52 may display, for example, the last time at which the apparatus 14 detected participation in a handshake operation by the modem 16 and opened the switch 34 to interrupt data transmissions between the personal computer 18 and the PSTN 12.

The apparatus 14 may also include a sound device 54, such as a speaker, in communication with the processor 40. The sound device 54 may, for example, produce a sound when the processor 40 outputs a signal to open the switch 34 and interrupt the data transmissions between the personal computer 18 and the PSTN 12.

The output devices such as, for example, the LED 48, the display device 52, and the sound device 54, may be located near the other components of the apparatus 14, such as the relay 34, filter 38 and the processor 40. According to other embodiments, the output devices are located remote from the other components of the apparatus 14. For example, the sound device 54 and the display device 54 may be located away from the other components of the apparatus 14, such as in a location which is easier for a user to monitor the output devices. According to such an embodiment, the processor 40 may communicate with the output devices by, for example, conventional hard wiring or remote signals.

The apparatus 14 may also include a voltage sense line 56. The voltage sense line 56 may be connected between the communications link 28 of the apparatus 14 and an input to the processor 40. The processor 40 may monitor the voltage on the voltage sense line 56 to determine whether the apparatus is disconnected from the PSTN 12 and the user devices, such as the personal computer 18 and the telephone 20. For example, if the processor 40 detects zero volts on the voltage sense line 56, the processor 40 may output a signal to, for example, the display device 52 or the sound device 54, to indicate that the apparatus 14 has been disconnected. According to such an embodiment, therefore, the apparatus 14 of the present invention may indicate whether an attempt has been made to disable the apparatus 14 by disconnecting it from the modem 16 and the PSTN 12.

The apparatus 14 may also include a clock circuit 58 connected to the processor 40. The clock circuit 58 may be, for example, a 555 timer chip, and may be used to provide an external clock signal to the processor 40 to, for example, synchronize the operations of the processor 40.

The present invention may be used to prohibit the establishment of a connection between a personal home computer and a remote data network, such as the Internet, while maintaining connectivity for the telephone. Thus a parent, may program the apparatus 14 to prohibit connections between the home personal computer and the Internet during certain times of the day, such as when children may have unsupervised access to the computer, without losing the functionality of the telephone 20. In addition, the output devices may be used to alert a parent that the apparatus 14 has interrupted data transmissions along the communications link 28. For example, the LED 48 of the apparatus 14 may be illuminated when the apparatus 14 interrupts data transmissions. Also, the sound device 54 may produce a sound to alert the parent. Additionally, the display device 52 may, for example, output a list of the times that the apparatus 14 interrupted data transmissions. Furthermore, the input device 46 and the output devices need not be located proximately to the other components of the apparatus 14, but rather may be remotely located, such as in the bedroom of the parent. Accordingly, some components of the apparatus 14, such as the relay 34, filter 38, and processor 40, may be located where the telephone lines from the PSTN 12 enter the residence, and the input device 46 and output devices 48, 52, 54 may be more conveniently located. In addition, the apparatus 14 may alert a parent if the apparatus 14 has been disconnected, thus discouraging sabotage.

Figure 3:
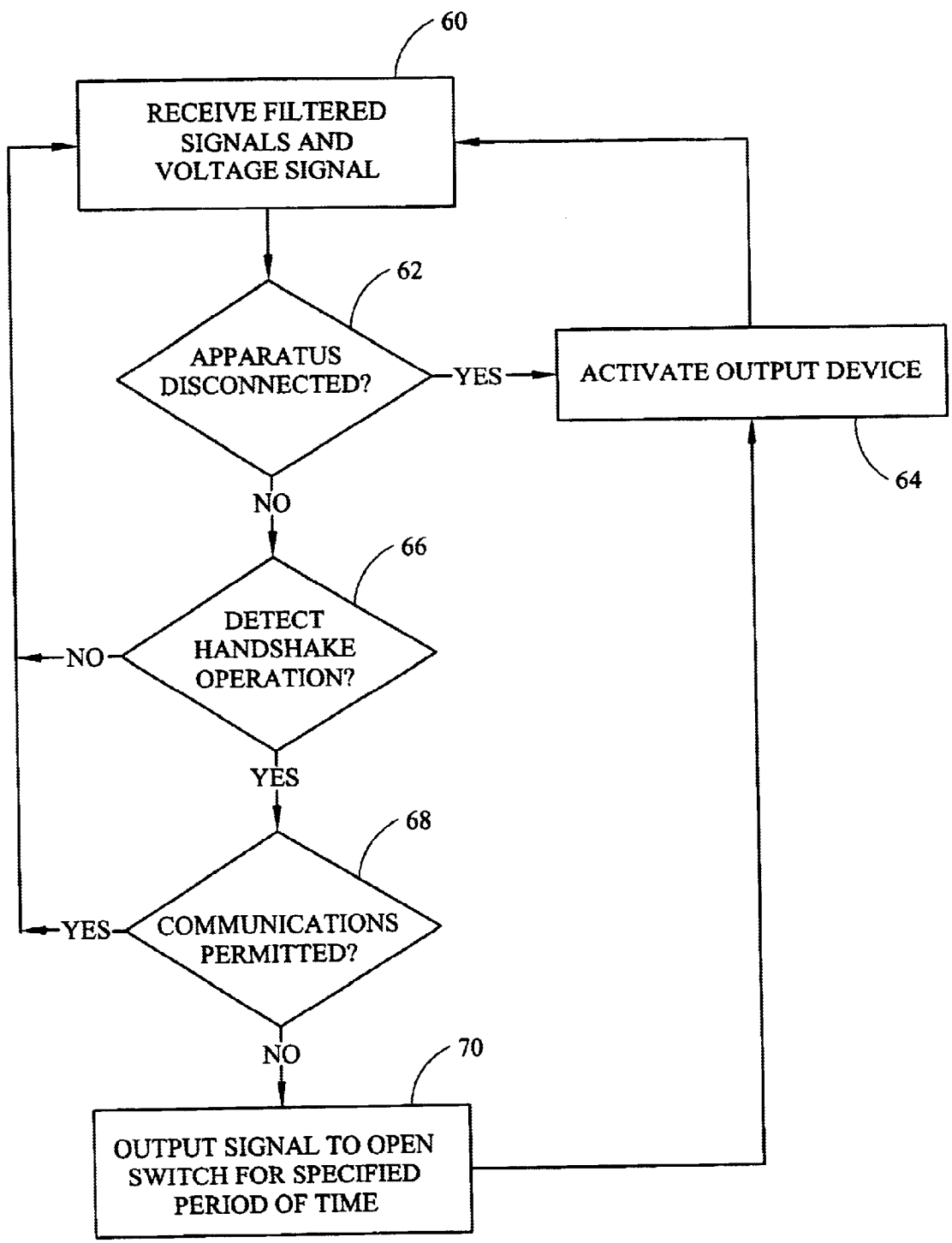
FIG. 3 is a block diagram illustrating the process flow through the processor of the apparatus of FIG. 2 according to one embodiment of the present invention.

FIG. 3 is a block diagram of the process flow through the processor 40 of the apparatus 14 of FIG. 2 according to one embodiment of the invention. The process flow commences at block 60 with receipt of the filtered signals from the filter 38 and the voltage signal from the voltage sense line 56. The process flow advances to block 62, where the processor 40 determines whether the apparatus 14 has been disconnected. The processor 40 may determine whether the apparatus 14 has been disconnected by monitoring the voltage along the communications link 28 via the voltage sense line 56. If the processor 40 determines that the apparatus 14 has been disconnected, the process flow advances to block 64, where an output device is activated to indicate that the apparatus 14 has been disconnected. If the processor 40 determines that the apparatus 14 has not been disconnected, the process flow proceeds to block 66.

At block 66, the processor 40 determines whether the modem 16 is participating in a handshake operation. The processor 40 may determine whether the modem 16 is participating in a handshake operations by monitoring the received filtered signals to determine whether they are indicative of the frequency patterns utilized in a handshake operation of the modem 16. The processor 40 may detect that a handshake operation is in progress by comparing the received filtered signals with known signal patterns indicative of the handshake operation of the modem 16.

If the processor 40 does not detect a handshake operation, the processor 40 does not open the switch 34, and thereby maintains the communications link 28 between the input and output terminals 30, 32 of the apparatus 14. The process flow then returns to block 60.

Conversely, if at block 66 the processor 40 detects a handshake operation, the flow proceeds to block 68, where the processor 40 determines if communications are permitted. The processor 40 may determine whether communications are permitted based on the programming of the processor 40 through the input device 46. For example, a user may program the processor 40 to prohibit communications between the personal computer 18 and the PSTN 12 between 9 a.m. and 4 p.m. on a particular day. Consequently, if the processor 40 detects a handshake operation outside of that time frame, i.e., if the processor 40 determines communications are permitted, the communications link 28 is maintained and the process flow returns to block 60.

Conversely, if at block 68 the processor 40 determines that communications are not permitted, the process flow advances to block 70, where the processor 40 outputs a signal to open the switch 34 and thereby interrupt the data transmissions along the communications link 28. According to one embodiment of the present invention, as discussed hereinbefore, the processor 40 may only open the switch 34 for a specified period of time, which is longer than is necessary to prohibit the establishment of a connection by the modem 16 between the personal computer 18 and the PSTN 12.

From block 70, the process flow proceeds to block 64 where, because the processor 40 detected involvement in a handshake operation by the modem 16, the processor 40 activates an output device. For example, the processor 40 may energize the LED 48 to illuminate the LED 48. Additionally, the processor 40 may output a signal to the sound device 54 to produce a sound for alerting a listener that the apparatus 14 has interrupted a data transmission along the communications link 28. In addition, the processor 40 may output information to the display device 52 to indicate to a viewer that the apparatus 14 has interrupted a data transmission along the communications link 28.

Figure 4:
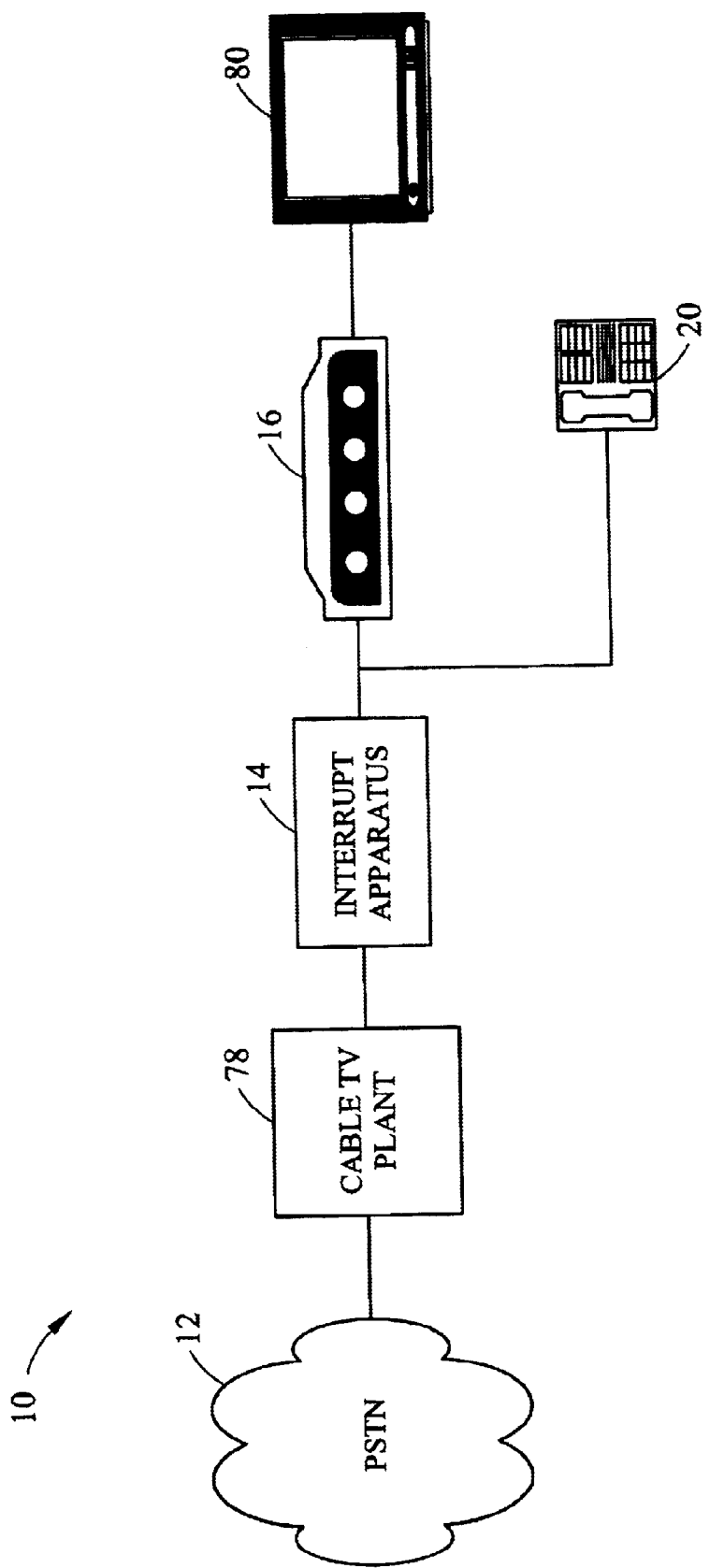
FIG. 4 is a block diagram of a communications network according to another embodiment of the present invention.

FIG. 4 is a block diagram of the network 10 according to another embodiment of the present invention. The embodiment illustrated in FIG. 4 is similar to the embodiment illustrated in FIG. 1, except that the network 10 includes a cable TV (CATV) plant 78. In addition, a television 80 is in communication with the modem 16 rather than a PC. The network 10 illustrated in FIG. 4 may be employed where, for example, telephony signals for the telephone network are provided to customer premises terminating equipment, such as the telephone 20, over the cables of the CATV network. According to such an embodiment, the apparatus 14 may be utilized to prevent data transmissions between the GATV plant 78 and the television 80, while still permitting data transmissions between the PSTN 12 to the telephone 20.

For such embodiment, as discussed hereinbefore, the apparatus 14 may monitor the handshake operation of the modem 16 to determine if it is attempting to establish a connection between the television 80 and the CATV plant 78. The frequency patterns of such handshake operations for CATV transmissions are typically in the 5–30 MHz range. Accordingly, the filter 38 may be tuned to pass signals within this range, and the processor 40 may be programmed to detect frequency patterns in this range. Thus, the present invention may additionally be used to prevent data transmission to a television as well as to a PC, as discussed hereinbefore with respect to FIGS. 1–3. Accordingly, a parent could use the apparatus 14 of the present invention to prevent unsupervised children from accessing inappropriate cable programming, while still maintaining telephone functionality.

Although the present invention has been described herein with reference to certain embodiments, those of ordinary skill in the art will recognize that many modifications and variations of the present invention may be implemented. For example, for the process flow illustrated in FIG. 3, the processor 40 may detect whether communications are permitted prior to monitoring the signals for participating in a handshake operation. The foregoing description and the following claims are intended to cover all such modifications and variations.

What is claimed is:

1. An apparatus for preventing a computing device from connecting to a remote data network, the apparatus comprising:

a switch connected in series along a telecommunication line that transmits voice and data;

a bandpass filter connected to the telecommunication line and having a bandpass frequency range for passing coded signals associated with a handshake operation involving a modem connected to the computing device and the telecommunication line; and a processor connected to the bandpass filter, wherein the processor is programmed to detect the handshake operation based on the coded signals and to output a control signal for opening the switch when the handshake operation is detected.

2. The apparatus of claim 1, wherein the bandpass frequency range of the bandpass filter is between 300–3000 Hz.

3. The apparatus of claim 1, wherein the bandpass frequency range of the bandpass filter is between 5–30 MHz.

4. The apparatus of claim 1, wherein the processor is programmed to detect the handshake operation by monitoring frequency patterns of the coded signals passed by the bandpass filter.

5. The apparatus of claim 1, wherein the switch is a relay.

6. The apparatus of claim 5, wherein the relay includes normally-closed single pole/single throw relay.

7. The apparatus of claim 5, wherein the relay includes a pole connected in series along the telecommunication line and a coil in magnetic communication with the pole, wherein an output terminal of the processor is connected to the coil.

8. The apparatus of claim 1, wherein the bandpass filter is a discrete element.

9. The apparatus of claim 1, further comprising a first buffer having a first input terminal connected to an output terminal of the processor and an output terminal connected to a control terminal of the switch.

10. The apparatus of claim 9, wherein the first buffer includes a second input terminal connected to a power supply.

11. The apparatus of claim 10, wherein the first buffer is an operational amplifier.

12. The apparatus of claim 1, wherein the processor produces the control signal on an output terminal of the processor to open the switch when the processor detects the handshake operation.

13. The apparatus of claim 1, further comprising an input device in communication with the processor.

14. The apparatus of claim 1, further comprising at least one output device in communication with the processor.

15. The apparatus of claim 14, wherein the output device is selected from the group consisting of an LED, a sound device, and a display device.

* * * * *